US010015463B2

United States Patent
Brahms et al.

(10) Patent No.: US 10,015,463 B2
(45) Date of Patent: Jul. 3, 2018

(54) LOGGING EVENTS IN MEDIA FILES INCLUDING FRAME MATCHING

(71) Applicants: SONY CORPORATION, Tokyo (JP); SONY PICTURES TECHNOLOGIES INC., Culver City, CA (US)

(72) Inventors: Jason Brahms, Culver City, CA (US); Oleksandr Zhukov, Kiev (UA); Oleg Sharov, Kiev (UA)

(73) Assignees: SONY CORPORATION, Tokyo (JP); SONY PICTURES TECHNOLOGIES, INC., Culver City, CA (US)

( * ) Notice: Subject to any disclaimer, the term of this patent is extended or adjusted under 35 U.S.C. 154(b) by 0 days.

(21) Appl. No.: 13/621,747

(22) Filed: Sep. 17, 2012

(65) Prior Publication Data
US 2013/0086051 A1 Apr. 4, 2013

Related U.S. Application Data

(63) Continuation-in-part of application No. PCT/US2012/020220, filed on Jan. 4, 2012, which is
(Continued)

(51) Int. Cl.
*G06F 17/30* (2006.01)
*H04N 9/82* (2006.01)
(Continued)

(52) U.S. Cl.
CPC ..... *H04N 9/8227* (2013.01); *G06F 17/30058* (2013.01); *G06F 17/3082* (2013.01);
(Continued)

(58) Field of Classification Search
CPC ......... G06F 17/30802; G06F 17/30784; G06F 17/30277; G06F 17/30091;
(Continued)

(56) References Cited

U.S. PATENT DOCUMENTS

2003/0177503 A1  9/2003  Sull et al.
2004/0125124 A1  7/2004  Kim et al.
(Continued)

OTHER PUBLICATIONS

Stackoverflow.com, "How can I quantify difference between two images?", Oct. 10, 2008 and Oct. 14, 2010. Retrieved from the Internet: https://stackoverflow.com/questions/189943/how-can-i-quantify-difference-between-two-images/3935002 and https://stackoverflow.com/revisions/3935002/1. Retrieved on Jun. 24, 2017.*

(Continued)

*Primary Examiner* — Kristopher Andersen
(74) *Attorney, Agent, or Firm* — Procopio, Cory, Hargreaves & Savitch LLP

(57) ABSTRACT

Comparing images, including: selecting a target image; selecting one or more search images; comparing the target image to a negative image corresponding to each search image to generate an image comparison score for each search image; and identifying the search image with the best image comparison score. Keywords include logging events and frame matching.

18 Claims, 20 Drawing Sheets

Related U.S. Application Data a continuation of application No. 13/026,134, filed on Feb. 11, 2011.

(60) Provisional application No. 61/429,720, filed on Jan. 4, 2011, provisional application No. 61/534,275, filed on Sep. 13, 2011, provisional application No. 61/624,123, filed on Apr. 13, 2012.

(51) Int. Cl.
    *H04N 21/47*     (2011.01)
    *H04N 21/4143*     (2011.01)
    *H04N 21/81*     (2011.01)
    *H04N 21/8543*     (2011.01)
    *G06F 3/0484*     (2013.01)

(52) U.S. Cl.
    CPC .. *G06F 17/30091* (2013.01); *G06F 17/30277* (2013.01); *H04N 21/4143* (2013.01); *H04N 21/47* (2013.01); *H04N 21/8173* (2013.01); *H04N 21/8543* (2013.01); *G06F 3/04842* (2013.01)

(58) Field of Classification Search
    CPC ........... G06F 17/30058; G06F 17/3082; G06F 3/04842; G06K 9/6202; H04N 9/8227; H04N 21/8543; H04N 21/8173; H04N 21/4143; H04N 21/47
    USPC ........................................................ 707/752
    See application file for complete search history.

(56) References Cited

U.S. PATENT DOCUMENTS

| | | |
|---|---|---|
| 2005/0165840 A1 | 7/2005 | Pratt et al. |
| 2006/0085477 A1 | 4/2006 | Phillips et al. |
| 2008/0025596 A1* | 1/2008 | Podilchuk .................... 382/155 |
| 2008/0059991 A1* | 3/2008 | Romano ........... G06F 17/30802 725/19 |
| 2009/0130681 A1 | 5/2009 | Carroll |
| 2010/0309379 A1 | 12/2010 | Schoenblum et al. |
| 2011/0106656 A1* | 5/2011 | Schieffelin .................. 705/26.9 |
| 2012/0308205 A1* | 12/2012 | Gao .............................. 386/241 |

OTHER PUBLICATIONS

International Search Report and Written Opinion dated Apr. 30, 2012, issued in PCT/US12/20220, 8 pages.
International Search Report and Written Opinion dated Nov. 21, 2012, issued in PCT/US12/55213, 8 pages.

* cited by examiner

| Show filter | Video info | Logos |
|---|---|---|

| Reset | All | Audio | Bars and Tone |
|---|---|---|---|
| Blacks | Caption | Credits | Cropping |
| Dialogue | Foreign Travel | Graphics | Insert |
| Language | Logo | Mains | Mastering Note |
| Music | Program | QC Issues | Slates |
| Speaker Gender | Subtitles | Tape | Textless |
| Trailer | Transititons | Unknown | |

| Save | Edit | Import |
|---|---|---|

Package Name* extraordinarymeasures_2010_hd_16x9_178_2398
PO Number* 230349-1
Tech Ops Ingest Coordinator* ltayers
Encode Date* 10-09-2010
Vendor/Encoding Facility* Sony DAC
Content Type* Feature
Title* Extraordinary Measures

FX Productions
Description:

Play
Delete

00:00:00.000

KZK Productions
Description:

Play
Delete

00:00:00.000

SONY
PICTURES
TELEVISION

Sony Pictures Television International
Description:

Play
Delete

Submit   Close

| Queue | Video | Audio | Audio Ingest | Textless | | | | admin | Logout |

▽ Matches

| | Match | Preview | | |
|---|---|---|---|---|
| ▷ Italian | 01:20:20:18 | 00:22:22:02 | 01:03:43:18 | 00:05:44:02 |
| ▷ German | | | | |

▷ Russian (Russia)

| 31703 | 31791 | 3695 | | 3783 |
| 85 | 32725 | 85 | | |
| 31899 | | 7971 | | 8298 |
| 127 | 32466 | 127 | | 8538 |
| 32256 | | 8328 | | |
| 210 | 32692 | 210 | | 131668 |
| 32559 | | 131535 | | |
| 111 | | 111 | | |

00:22:20.552  01:20:19:05  32141     ⊲⊲ △ ‖ ▷ ⊳⊳     00:05:42.554  01:03:42:05  8213

( Story board )  Precise match

| 31899 | 31920 | 31940 | 31961 | 31981 | 32002 | 32022 | 32043 | 32063 |

▷ Spanish (Castilian)
▷ French (Parisian)
▷ French (Canadian)
▷ Portuguese (Brazil)
▷ Spanish (Latin Am)

| 7971 | 7992 | 8012 | 8033 | 8053 | 8074 | 8094 | 8115 | 8135 |

| Edit | | | | Nudge ▽ △ |
| Automatic | ○ | ☐ Playlist | Zoom ──○── | |

LOGGING EVENTS IN MEDIA FILES INCLUDING FRAME MATCHING

CROSS-REFERENCE TO RELATED APPLICATIONS

This application is a continuation-in-part application of PCT Application No. PCT/US12/20220, filed Jan. 4, 2012, and entitled "Logging Events in Media Files," which claims priority to: U.S. Provisional Patent Application No. 61/429,720, filed Jan. 4, 2011, and entitled "Tech Logger"; U.S. patent application Ser. No. 13/026,134, filed Feb. 11, 2011, and entitled "Logging Events in Media Files"; and U.S. Provisional Patent Application No. 61/534,275, filed Sep. 13, 2011, and entitled "Tech Logger". This application also claims the benefit of priority of U.S. Provisional Patent Application No. 61/624,123, filed Apr. 13, 2012, and entitled "Frame Matching". The disclosures of the above-referenced applications are incorporated herein by reference.

BACKGROUND

Field of the Invention

The present invention relates to logging events, and more specifically, to logging events in media files including frame matching.

Background

Creating lists of events for a video file by hand is tedious and prone to error. Reviewing a tape or video file in one tool while manually entering time codes in another can lead to mistakes and inconsistency. These types of problems can make it more difficult to consistently handle video files in a library.

SUMMARY

Embodiments of the present invention provide for displaying audio and video from data files and attaching metadata to the files.

In one implementation, a method of comparing images is disclosed. The method includes: selecting a target image; selecting one or more search images; comparing the target image to a negative image corresponding to each search image to generate an image comparison score for each search image; and identifying the search image with the best image comparison score.

In another implementation, a non-transitory tangible storage medium storing a computer program for comparing images is disclosed. The computer program includes executable instructions that cause a computer to: select a target image; select one or more search images; compare the target image to a negative image corresponding to each search image to generate an image comparison score for each search image; and identify the search image with the best image comparison score.

Other features and advantages of the present invention will become more readily apparent to those of ordinary skill in the art after reviewing the following detailed description and accompanying drawings.

BRIEF DESCRIPTION OF THE DRAWINGS

FIG. 3B shows a screenshot of a list of filters displayed when the filter tab is selected.

FIG. 3C shows video information displayed when the video info tab selected in the tabs area.

FIG. 3D shows logos information displayed when Logos is selected in the tabs area.

FIGS. 6-17 are illustrations of implementations of user interfaces for a logger, such as for presenting, selecting, conforming, matching, and logging audio and video elements.

DETAILED DESCRIPTION

Certain implementations as disclosed herein provide for displaying audio and video from data files and attaching metadata to the files. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, a software tool referred to as a logger is used to log events in a media file, such as a movie. The logger tool provides a user interface allowing a user to view the video in multiple ways and add information to the file to track and log events in the file including the locations of bars and tone, slates, content, logos, commercial blacks, quality control issues, subtitles, and captions. The logger tool allows the user to capture and validate key events within the media file required to enable downstream automated post production processes and workflows.

In one implementation, the user interface provides access to the media file and also provides an interface to create, track, and edit events for that media file. The user interface allows automatic presentation and association of events with the media file at their proper location, which can improve throughput and quality of the data. Events can be generated manually by the user within the logger tool and also generated by importing lists or tables of events created externally. The events can then be associated with the media file within the logger tool. For example, a user can import a quality control report into the logger tool and the logger tool is used to create events for the file matching the quality control entries. In another implementation, the logger tool can also present information and views on frame matching and/or differentiation based on imported matched and/or differentiated data.

Figure 1:
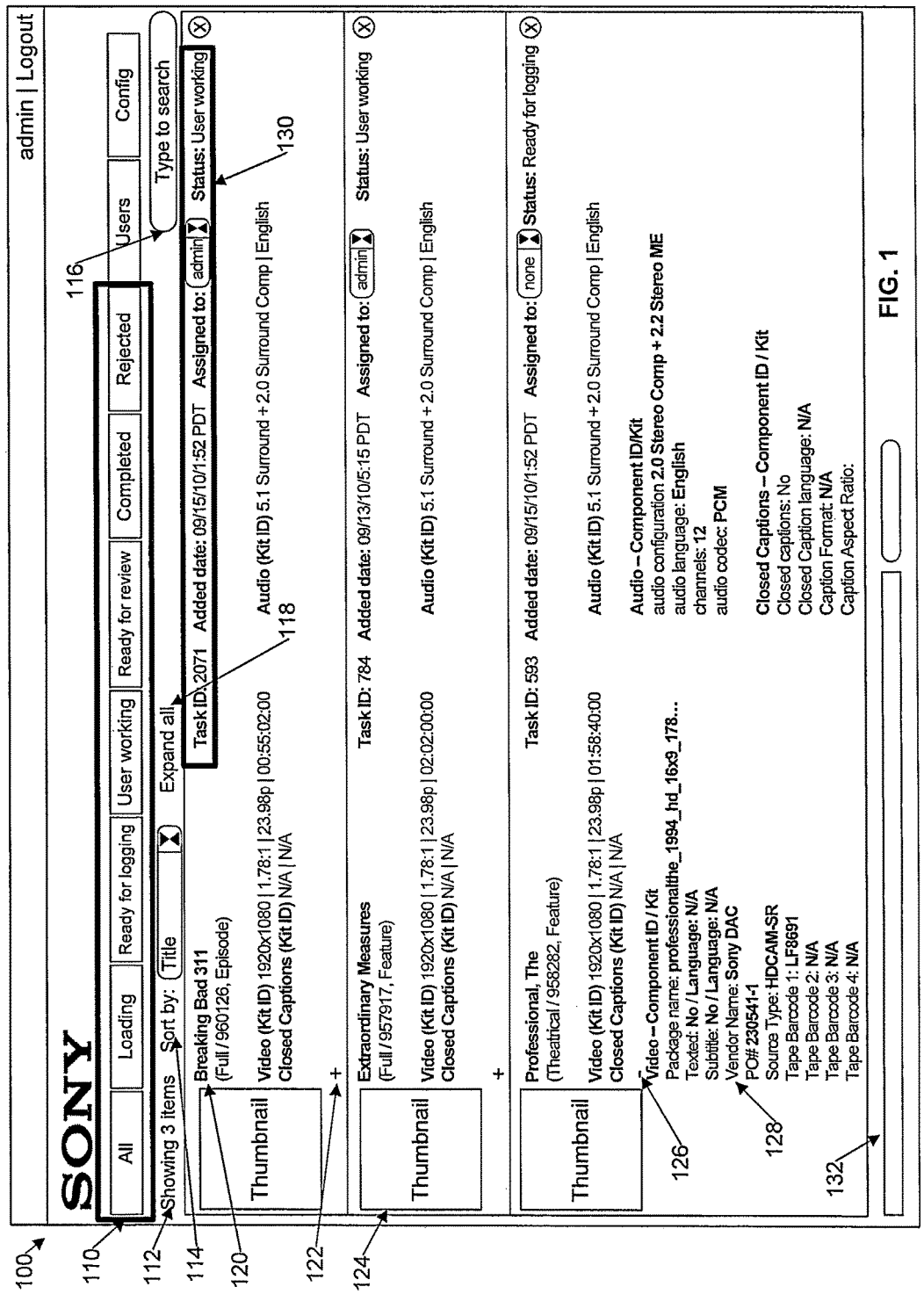
FIG. 1 shows a screen shot of a queue page of a logger in accordance with one implementation of the present invention.

FIG. 1 shows a screen shot of a queue page 100 of a logger in accordance with one implementation of the present invention. Queues shown on the queue page 100 are designed to track the progress of media files through each status of a logging process.

In the illustrated implementation of FIG. 1, the queue page 100 of the logger includes following items/fields: status bar 110, item counter 112, 'sort by drop-down' 114, search field 116, 'expand/collapse all' 118, title 120, identifiers 130, expand 122, thumbnail 124, collapse 126, file specs 128, 'add movie' field 132, and logout. The status bar 110 is clicked to display the files in the selected status, which includes All, Loading, Ready for Logging, User working, Ready for Review, Completed, and Rejected. The item counter 112 displays the number of files showing for the chosen status. The 'sort by drop-down' item 114 is clicked to select an identifier (e.g., Title, Status, Task Id, Added date, Feature, User assigned, and Kit Id) in which the files will be arranged and viewed. The search field 116 displays the files that meet the entered keyword criteria. The 'expand/collapse all' item 118 is clicked to expand or collapse additional file information (i.e., file specs) for all files in the current status. The title 120 includes a file name that is clicked to proceed to a video page of the logger. The identifiers field 130 shows file specific identifying information. The expand icon 122 is clicked to display additional file information. The thumbnail 124 shows a single frame selected to visually represent the file. The collapse icon 126 is clicked to hide additional file information. The file specs 128 show additional technical file information. The 'add movie' field 132 is used to insert a selected file not currently in the logger tool into a loading status.

Figure 2:
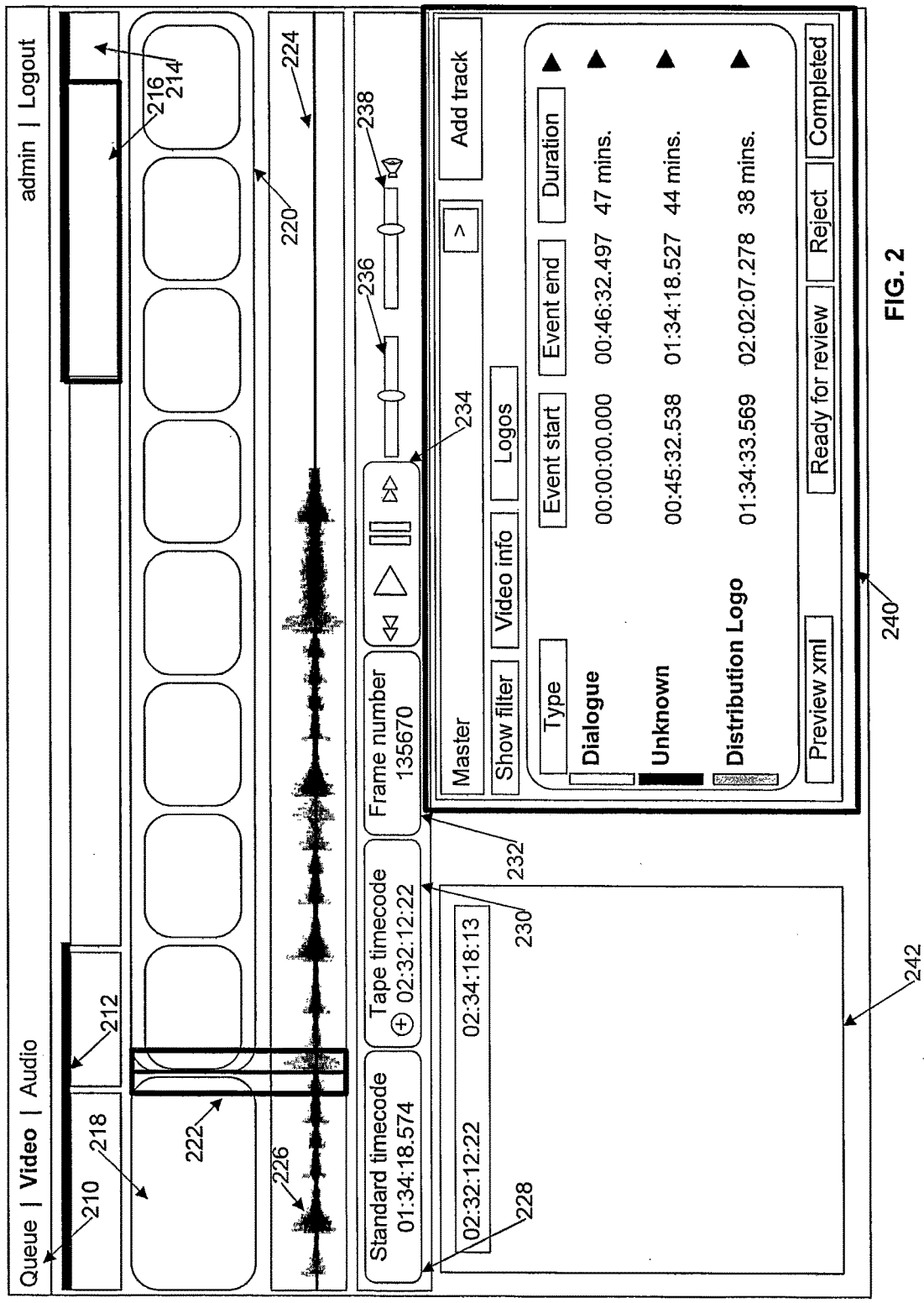
FIG. 2 shows a snapshot of a video page of the logger reached by clicking a title including a media file name.

FIG. 2 shows a snapshot of a video page 200 of the logger reached by clicking a title including a media file name (e.g., 120 in FIG. 1). In one implementation, the video page 200 of the logger includes sections, controls, and commands that are used to view, verify, and capture events. For example, the video page 200 of the logger provides/displays following: an adjustable filmstrip of thumbnails for all or part of a video file; audio waveforms for the video; the video with timing information (e.g., time code, tape time code, frame number); events associated with the video and their location in the file (e.g., by time code); interfaces to display and playback video and audio waveforms; interfaces to create, edit, and delete events for the video file; interfaces to create re-usable clips from a video file (e.g., creating new logos); interfaces for editing, importing, and copying events or groups of events within a file or across files; interfaces to a user through a web browser.

In the illustrated implementation of FIG. 2, the video page 200 includes following sections, controls, and commands: page selector 210, event overview 212, master strip 214, looking glass 216, event strip 218, event indicator 220, anchor 222, audio waveform 224, audio magnification 226, standard timecode 228, tape timecode 230, frame number 232, player controls 234, magnification slider 236, volume slider 238, player pane 242, and stack view 240. The page selector 210 is used to choose which page to view (e.g., Queue, Video, or Audio). The event overview 212 represents sections of the file containing events. In one case, known events and unknown events are represented by different colors.

The master strip 214 represents the entire file timeline from start to end. The looking glass 216 is located in the master strip 214 and magnifies the surrounded section of the file in the event strip 218. The default position of the looking glass 216 upon opening a new file contains the entire file. The event strip 218 is a magnified section located inside the looking glass 216 on the master strip 214 that can split the file into events. The event indicator 220 is a stroke that outlines each individual event. For example, a first thumbnail within the event indicator 220 is the first frame of the event, and a last thumbnail within the event indicator 220 is the last frame of the event. The anchor 222 is represented by a vertical line that crosses the event strip 218 and audio waveform which represents the location in the file. This file location will display in the player pane 242. The player controls 234 are buttons that control basic playback tasks such as playing, pausing, fast forwarding, and rewinding. The magnification slider 236 adjusts the size of the looking glass 216 which can increase or decrease the amount of the master strip 214 that is displayed in the event strip 218. The player pane 242 displays the frame located to the right side of the anchor 222. The stack view section 240 is the action center of the logger video page 200.

In one implementation, the video page 200 of the logger can be navigated using the sections, controls, and commands described above. For example, the master strip 214 can be navigated by clicking and dragging the looking glass 216 to the right or left to view different sections of the file in the event strip 218. The size of the looking glass 216 can be adjusted by moving the magnification slider 236 toward minutes to increase the size of the looking glass 216 and toward frames to decrease the size of the looking glass 216. In another example, the event strip 218 can be navigated by clicking and dragging the anchor 222 to the right or left along the event strip 218. The event strip 218 can be dragged to the right or left while the anchor 222 remains in the same location. Dragging the event strip 218 also moves the looking glass 216 in the master strip 214. When the desired event on the event strip 218 is clicked, the event strip 218 will move to place the anchor 222 before the first frame of the selected event. Either the Enter key can be pressed or the event on the event strip 218 can be clicked to also expand the event in the center of the strip 218. Up or down arrow key can be used to move to the next or previous event. In yet another example, when an event in the stack view 240 is selected, the event strip 218 will move to place the anchor 222 before the first frame of the selected event, and expand the event in the center of the event strip 218.

Figure 3A:
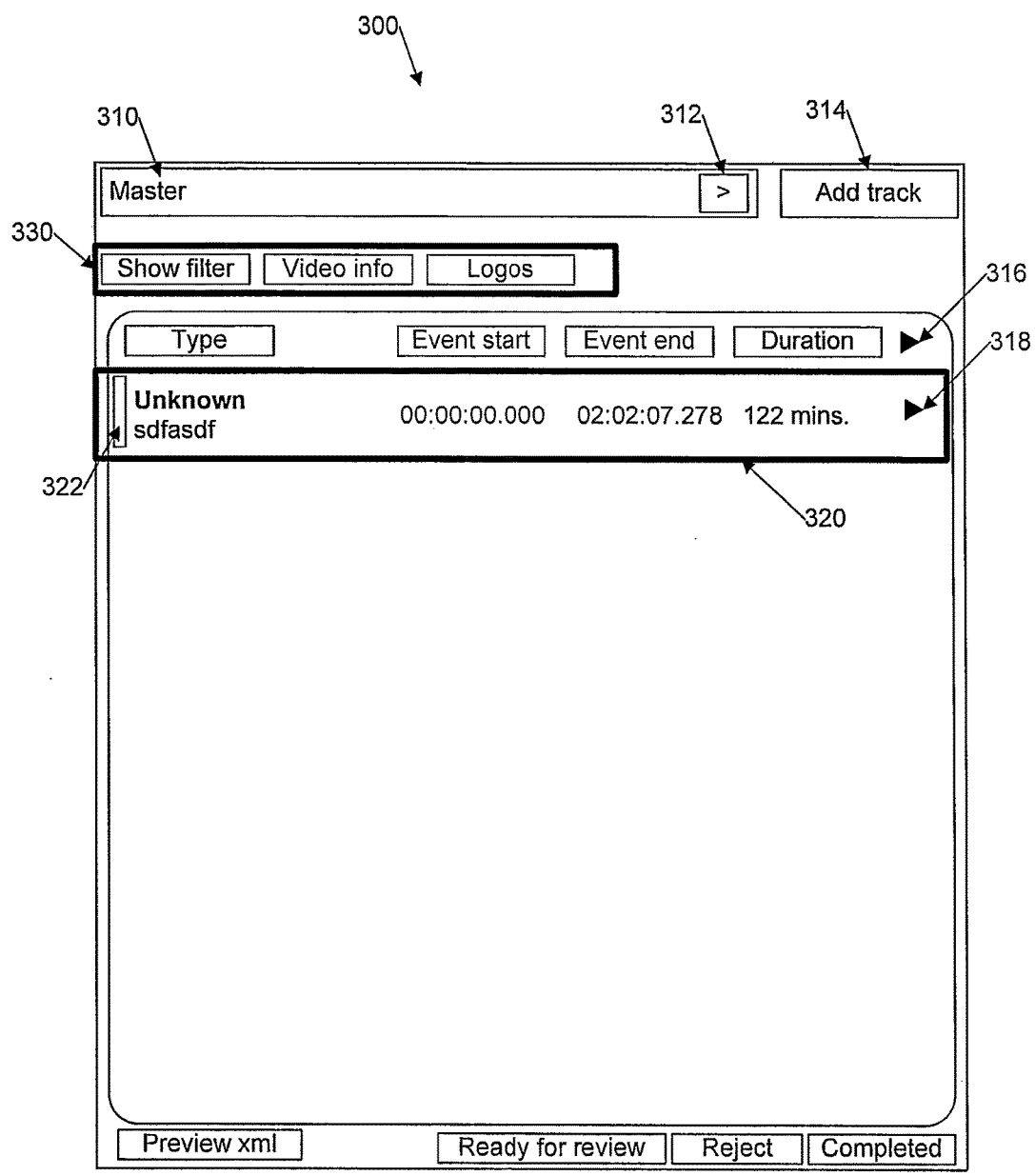
FIG. 3A shows a snapshot of a stack view in the video page of the logger in accordance with one implementation of the present invention.

FIG. 3A shows a snapshot of a stack view 300 in the video page 200 of the logger in accordance with one implementation of the present invention. The stack view 300 shows the tasks being completed as well as filter tools and other information. In the illustrated implementation of FIG. 3A, the stack view pane 300 includes track information 310 (including a track drop down button 312 and an add track button 314), tabs 330 for showing filters 332 (see FIG. 3B), video information 334 (see FIG. 3C), and logos 336 (see FIG. 3D), and event row 320. As described above, known events and unknown events can be represented by different colors 322. The stack view pane 300 further includes 'All Notes Expander' 316 and 'Notes Expander' 318. The track information 310 section provides options to: import quality control report, captions, subtitles, or script alignment; copy from a selected title; or create an unknown default event that represent the entire file.

FIG. 3B shows a screenshot of a list of filters 332 displayed when the filter tab is selected. A selection of one or more filter from the list of filters allows viewing of the events contained in an individual track by category. Thus, the filter can be selected to show in the track only the events in that filter category. More than one filter can be turned on at one time to allow viewing of the events in the selected filter categories by pressing multiple filter buttons.

FIG. 3C shows video information 334 displayed when the video info tab selected in the tabs area 330. The video information 334 provides information such as frame rate, language, and other pertinent video information.

FIG. 3D shows logos information 336 displayed when Logos is selected in the tabs area 330. To view logos in the logos window of the stack view 300, click the logos button under the track name. To search logos, click to place the cursor in the search field with the logo window open. To create a new logo, execute the following steps: create an event that represents the logo from start to end; click on the 'edit mode' icon in the stack view for the event that contains the logo; choose 'Logo' in the event category menu and the corresponding logo type (e.g., Logo, Production Company Logo, Distribution Logo, or Production Logo); place the anchor on the frame that most accurately represents the logo in the event strip; click the 'OK' button or double-click the correct event type in the event category menu; type in the desired logo name in the search field when the logo window appears over the stack view; click the 'Create New' button; and click the 'submit' button to assign the newly created logo to the event when the new logo appears in the stack view.

Returning to FIG. 3A, each event row 320 will display the event type it has been assigned, the event description, duration, as well as start and end. The measurement of the duration and start and end information will display based on the highlighted measurement field. Each event type is represented by a different color 322 in the 'event type' column in the stack view 300. Table 1 shown below broadly defines the available event types.

TABLE 1

| Type | Category | Definition |
| --- | --- | --- |
| Audio | Program Audio Start | |
| | Audio Fade Out | |
| | Audio "Two-Pop" | |
| | Audio Sync Point | A hard effect that can be used to sync the audio track with the visual queue. |
| Bars And Tone | Bars And Tone | SMPTE color bars together with a continuous 1000 Hz audio tone at the beginning of the file to calibrate playback equipment. |
| Blacks | Fade to Black | |
| | Blacks | |
| | Commercial Black | Periods of black picture over MOS placed where commercial breaks would be inserted. |
| | Black Roll-up/Pre-roll | Periods of black picture over MOS typically preceding bars and tone. |
| Caption | Caption | Verifying that the caption is correct and in sync with the video. |
| Credits | End Credit Start | |
| | End Credit End | Usually located at the end of program, credits contain information regarding the making of the program. |
| | Credits | |
| | Credits out of Safe Action | |
| | Credit Change | |
| | Scrolling end credits start | |
| | Foreign Credit/Dub Card | Credits that have been fully localized/White on black card that states the dub talent. |
| Cropping | Cropping | |
| Dialogue | Dialogue | |
| | Foreign Dialogue | |

TABLE 1-continued

| Type | Category | Definition |
| --- | --- | --- |
| Foreign Texted | Foreign Texted Start (by Language) | |
| | Foreign Texted | |
| | Foreign Texted End (by Language) | Dialogue that is in a language other than the stated OV of the file. |
| | Foreign Texted Slate | |
| Graphics | Graphics/Text | |
| | Text Over Picture | |
| | Text In Picture | |
| | Graphics Overlay | |
| Insert | | Insert Start |
| | | Insert |
| | Insert End | Texted video clip that is meant to be inserted in program to take the place of texted OV material |
| | | Insert Slate |
| Language Logo | Language Logo | |
| | Production Company Logo | Graphic and audio that represents the entity that produced the material. |
| | Distribution Logo | Graphic and audio that represents the line of business that is distributing the material. |
| | Production Logo (Customized to title) | Production Company Logo that has been integrated into program in such a fashion that it is not a standard production company logo. |
| Mains | Main Title | |
| | Main Title Start | |
| | Main Title End | |
| | First Hard Cut after Mains | |
| | Mains Over Picture | |
| | Out of Safe Title | |
| | Within Safe Action | |
| Mastering Note | Mastering Note | |
| Music Program | Music Program Start | |
| | Program End | |
| | Program | |
| QC Issue | QC - Picture issue | |
| | QC - Audio issue | |
| xxxSlates | Slate | |
| | Insert Slate | |
| | Program Slate | Information card that displays tape metadata relevant to the file such as feature title, aspect ratio, part - timecode, runtime, audio configuration, date P.O.#/ vendor facility, textless material, source material, etc. |
| | Trailers Slate | |
| | Textless Slate | |
| Speaker Gender | Speaker Gender | |
| Subtitles | Subtitle (in picture) | Textual versions of the dialog in films and television programs, usually displayed at the bottom of the screen. They can either be a form of written translation of a dialog in a foreign language, or a written rendering of the dialog in the same language, with or without added information to help viewers who are deaf and hard-of-hearing to follow the dialog. |
| | Subtitle (component validation) | |
| Tape | Start of Reel/Part | |
| | End of Reel | |
| | MultiPart Join Parts | |
| Textless | Textless | |
| | Textless Start | |
| | Textless End | Non-texted portions of the program located at the end of the file. |

TABLE 1-continued

| Type | Category | Definition |
|---|---|---|
| | | Some titles do not have textless material available. |
| Trailer | Textless Slate Trailer (English) Foreign Language Trailer (by language) | |
| Transitions | Last Hard Cut | |

Each track includes at least one event that represents the entire file from beginning to end, or many imported or copied events that combined include the entire file. Each new event is a portion of an existing event. Thus, to create a new event, place the anchor on or directly in front of the first frame of the event to be created in the event strip. This will display the first frame of the event in the player pane. Select to split the current event into two events. The frame to the right of the anchor now represents the first frame of the new event and the frame to the left of the anchor represents the last frame of the previous event. The event will automatically be categorized as Unknown.

Figure 4A:
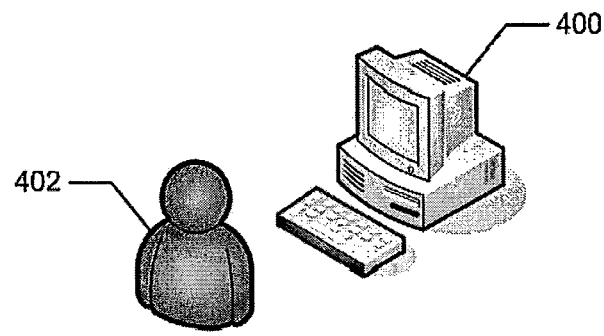
FIG. 4A illustrates a representation of a computer system and a user.

FIG. 4A illustrates a representation of a computer system 400 and a user 402. The user 402 uses the computer system 400 to log events in a media file, such as a movie. The computer system 400 stores and executes a logger 490.

Figure 4B:
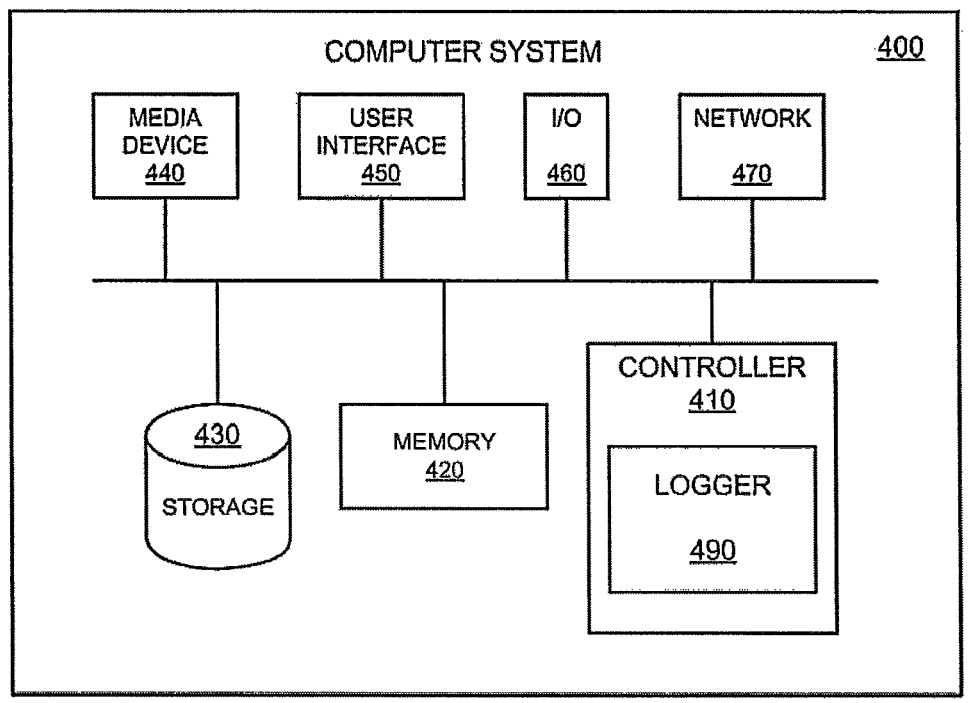
FIG. 4B is a functional block diagram illustrating the computer system hosting a logger.

FIG. 4B is a functional block diagram illustrating the computer system 400 hosting the logger 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the logger 490 as a software system, such as to enable logging of events in a media file. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the logger 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

Figure 5:
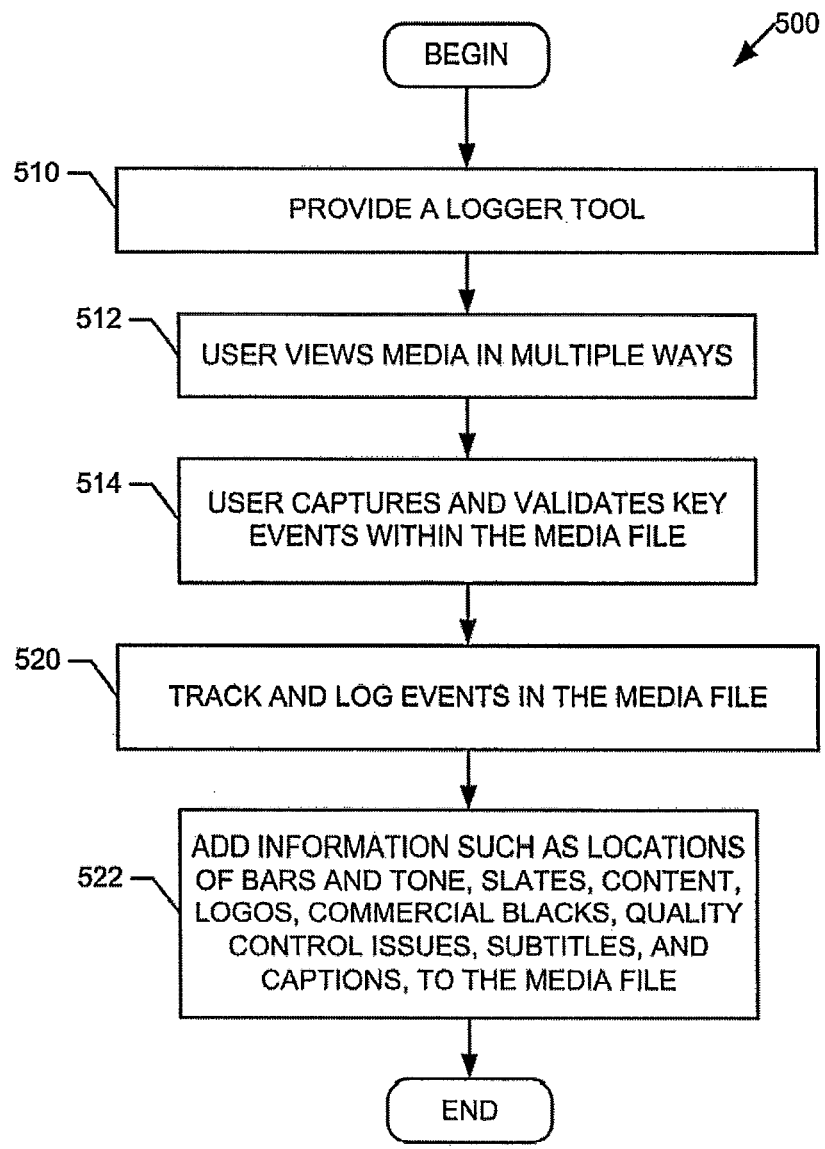
FIG. 5 is a flowchart illustrating a method of logging events in a media file in accordance with one implementation of the present invention.
Figure 7:
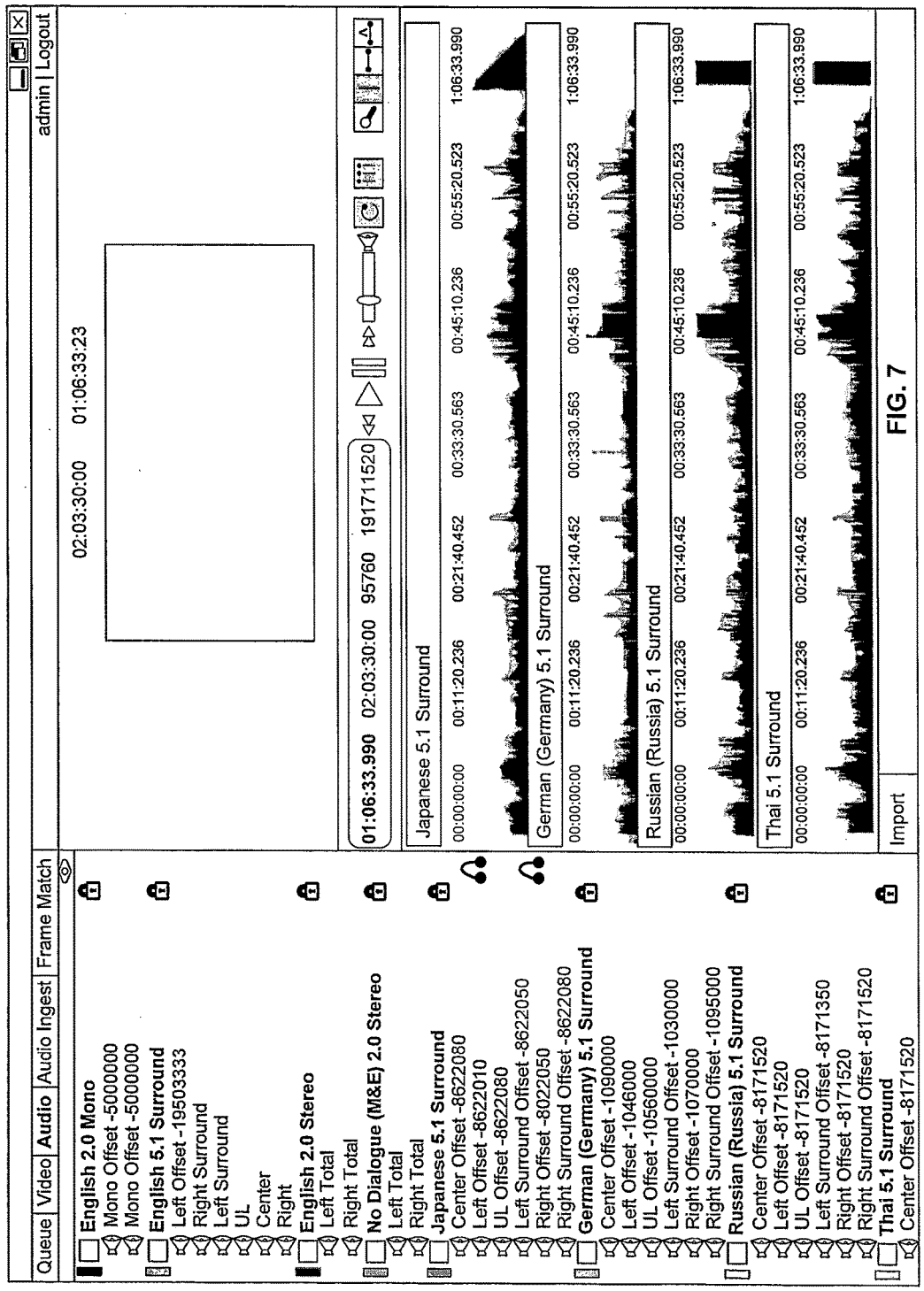
Figure 8:
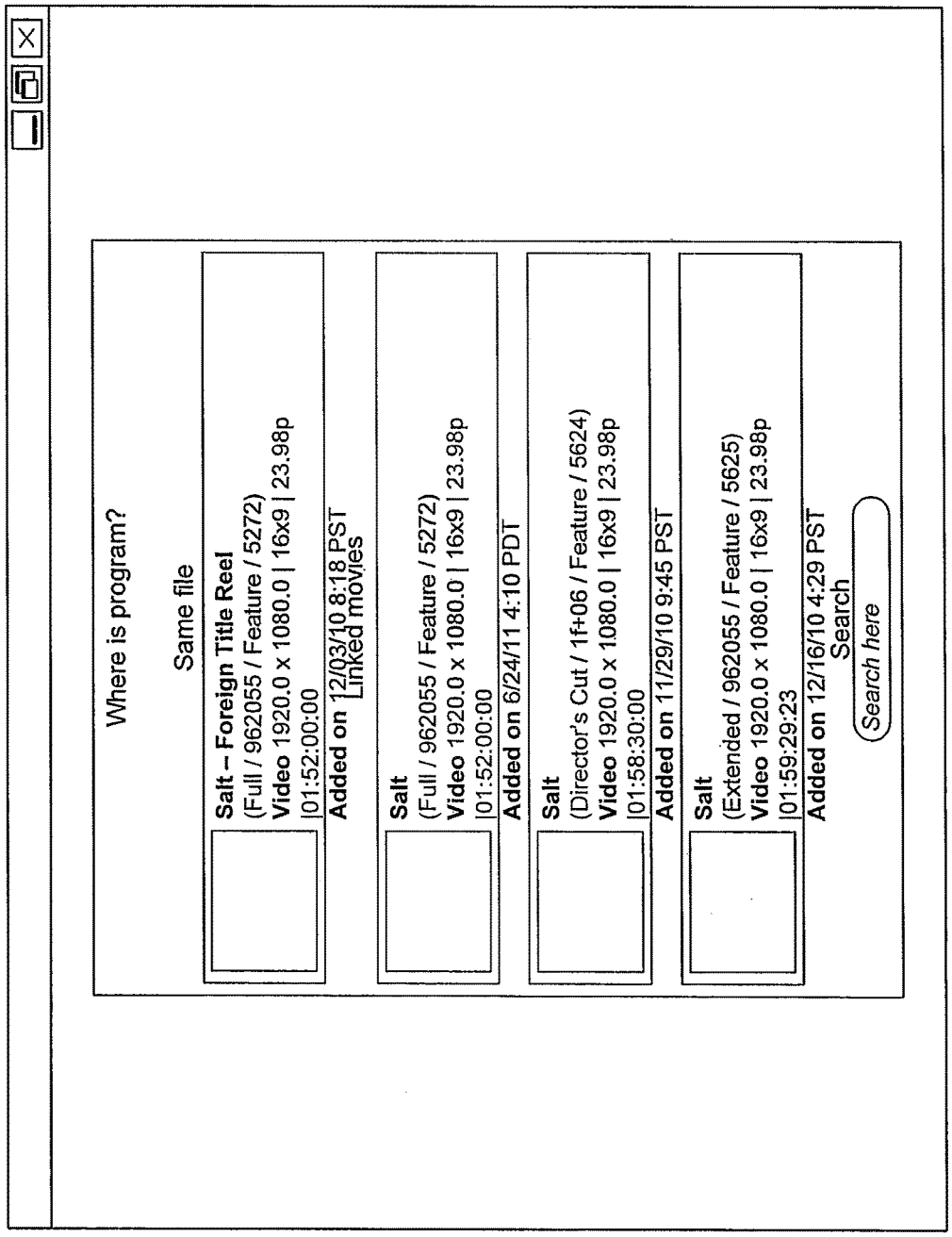
Figure 11:
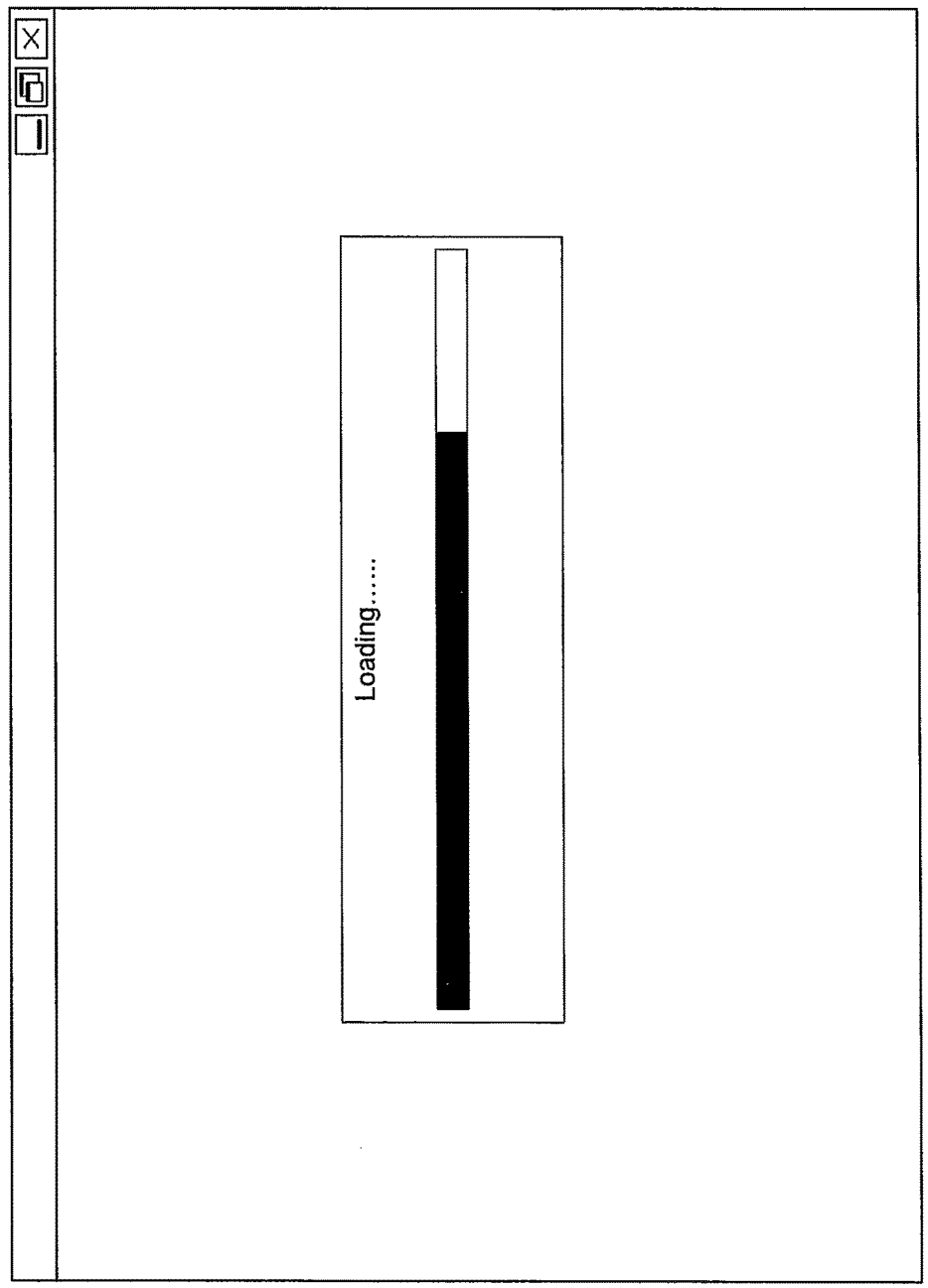
Figure 12:
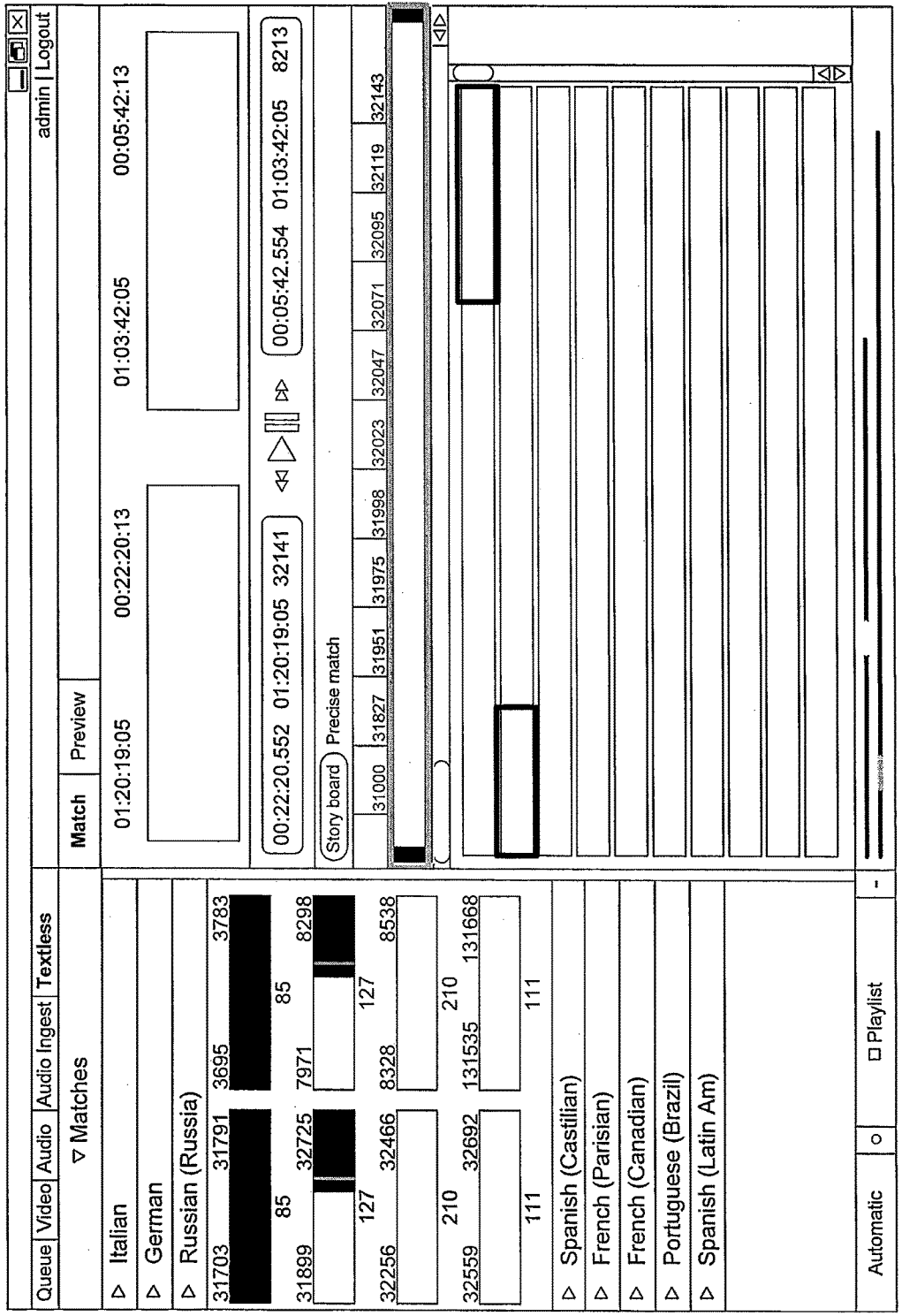
Figure 16:
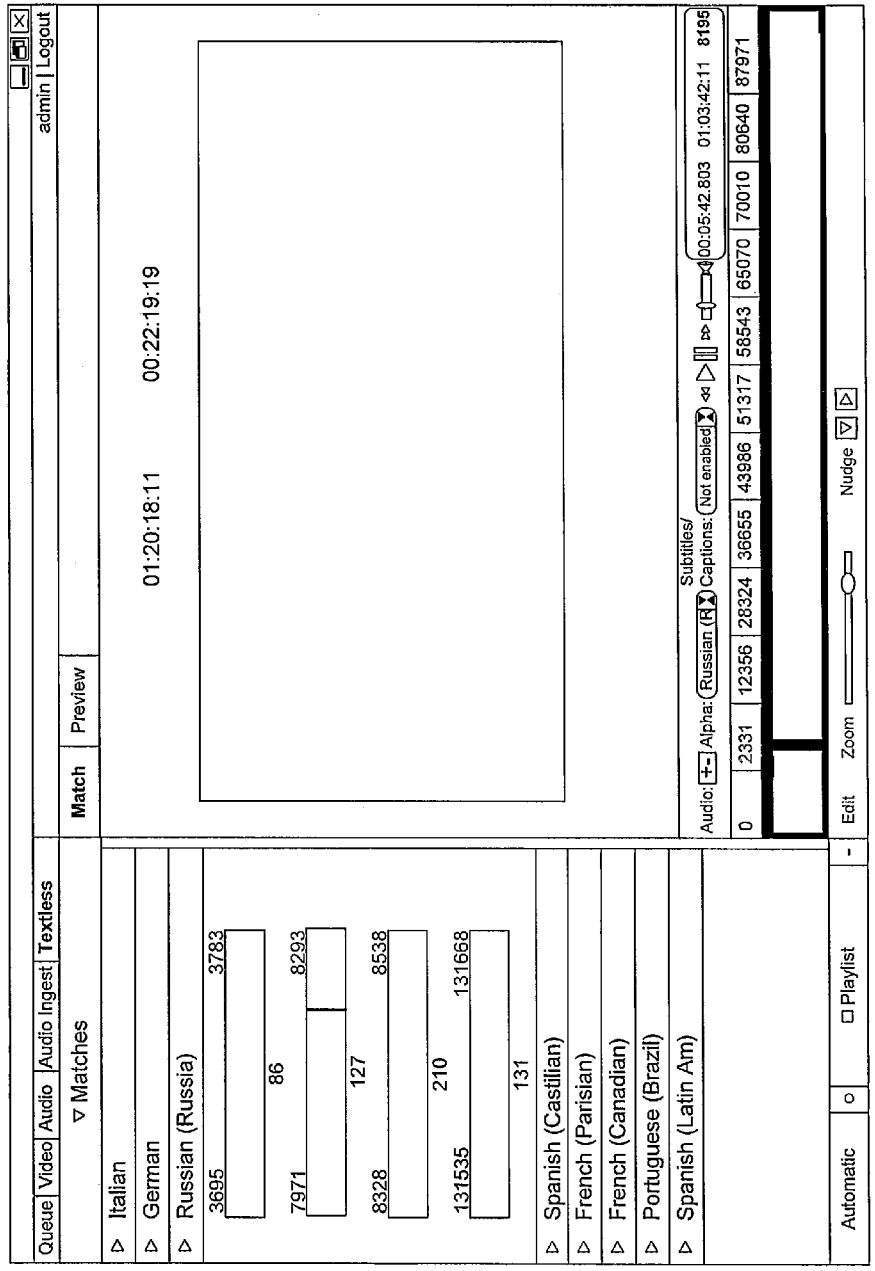

FIG. 5 is a flowchart illustrating a method 500 of logging events in a media file in accordance with one implementation of the present invention. In the illustrated implementation, the method comprises configuring a logger tool, at box 510, to allow a user to view media in multiple ways (box 512). The user also captures and validates key events within the media file, at box 514. Events in the media file are tracked and logged, at box 520, by adding information to the media file, at box 522, including locations of bars and tone, slates, content, logos, commercial blacks, quality control issues, subtitles, and captions.

FIGS. 6-17 are illustrations of implementations of user interfaces for a logger, such as for presenting, selecting, conforming, matching, and logging audio and video elements (e.g., frames, tracks, segments, clips, waveforms, filmstrips, events).

Various implementations can include, but are not limited to, one or more of the following items: (a) Providing an adjustable filmstrip of thumbnails for all or part of a video file; (b) Displaying audio waveforms for the video; (c) Displaying the video with timing information (e.g., time code, tape time code, frame number); (d) Displaying events associated with the video and their location in the file (e.g., by time code); (e) Providing a UI (user interface) to control the display and playback of video and audio waveforms; (f) Providing a UI to create, edit, and delete events for the video file; (g) Providing a UI to create re-usable clips from a video file (e.g., creating new logos); (h) Providing a UI for editing, importing, and copying events or groups of events within a file or across files; (i) Automatically creating selected events by analyzing a file (e.g., commercial blacks or slates); (j) Providing a UI and operations for frame matching, allowing a user to match frames within or across files; (k) Providing a UI and operations for audio conforms, finding similarities and differences in audio waveforms; (l) Providing a UI and operations for audio component creation; (m) Providing a UI and operations for AVID export—ability to export the frame match data to an Avid AAF (Advanced Authoring Format)/EDL (Edit Decision List) or Quicktime reference movie; (n) Providing a UI and operations for on screen annotation in the video UI (i.e. hand draw on the frame); (o) Providing a UI and operations for QC report generation; (p) Providing a UI and operations for auto text in picture detection; (q) Providing a UI and operations for speech to text processing and results display with editing capability; (r) Providing a UI and operations for manual transcription tools; (s) Providing the interface to a user through a web browser; (t) Providing the audio and video through the logger using streaming from a server, instead of or in addition to using download and local copies of files.

In one implementation, the logger includes components to support a set of features that allow users to match frames from the same, or different movie files. This frame matching feature's underlying algorithm centers around a basic concept known as the law of absolute difference, and compares positive and negative frames to determine relevance of the match and then returns the results based on a defined threshold. This functionality provides users with the ability to create textless masters and foreign texted masters by matching the inserts to the original program. In one example, a first file contains the original movie and a second file contains inserts, groups of frames to replace corresponding groups of frames in the original (e.g., frames with localized text for a particular language). Using frame matching, the user can identify the original frames that match the insert frames and then indicate which frames in the original movie file to replace with which frames from the insert file (manually and/or automatically). The logger can then output a new version using the original frames with selected frames replaced with the selected insert frames. Alternatively, the logger can create a file (e.g., a table of references) that guides playback between the original file and the insert file. A user can then create another file for different language using a different insert file.

The UI provides the users with the ability to see the results play side by side in a player window and includes default storyboard mode as well as a view in "precise" mode where users can fix and adjust if there are insert/original frame mismatches of inconsistencies. In addition, users can preview their versions "real-time" and toggle between languages. This allows for a preview of the foreign language master "virtual edit" before it's rendered into an actual file. During playback in the preview area, inserts will be added to the movie on the fly by keying off of the EDL created during the matching process. Users can also select audio and text elements to render as part of the preview.

In one implementation, the logger includes components to support a set of features for audio conforming and audio analysis that allow users to compare wave forms to each other and find similarities and/or differences. This technology is part of the logger feature set and is part of the audio UI. In another implementation, the audio analysis and/or audio UI can be implemented in a separate program or component. The following figures illustrate aspects of the audio UI. Users can select a "gold" reference channel—this is a channel that all of the other channels will be conformed to (e.g., offset or shifted to synchronize). Once the results come back the audio channels will lock into place and offsets will be recorded. Users then validate that the conform results are accurate and lock the component. As new components are ingested for that title and this auto conform process runs, only unlocked components will be analyzed.

In another implementation, the logger includes components to support a set of features for creating audio components. For example, a user can combine multi-part audio components to one part, e.g., 6 reels of audio rendered into 1 long play file. In one implementation, this audio component creation is also part of the logger audio UI. The audio UI provides the users a feature that allows users to ingest multi-part audio components, conform them and then render a new component. The resulting components could then be used in a distribution system or other post-production workflows. One implementation of audio component creation also provides these features: sample rate conversion, sync pop removal, basic envelopes and real-time preview.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the examples focus on displaying and logging for movies, but a logger can be specialized for other video, such as television shows, internet video, or user generated content, or for audio, such as radio or podcasts, or other content, such as games or text, or combinations thereof (e.g., matching and conforming video, audio, and text, such as for screenplay matching and tracking). All features of each example are not necessarily required in a particular logger implementation. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

Certain implementations as disclosed herein also provide apparatus and methods to implement a technique for matching frames of video or images. In one implementation, a computer system provides a user interface and search functionality so that a user can select one or more frames of video and a target set of frames. The user can then request the best match for the selected frames in the target set. The computer system compares the frames by comparing the absolute difference between frame images and returns the frames with the best results. In one such implementation, the computer system provides the frame matching as part of a video editing or video production tool.

Features provided in implementations can include, but are not limited to, one or more of the following items: (a) Providing a UI and operations for frame matching, allowing a user to match frames within or across files; (b) Matching one frame to one frame in a single set of frames; (c) Matching one frame to one frame in multiple sets of frames; (d) Matching multiple frames to multiple frames in a single set of frames; (e) Matching multiple frames to multiple frames in multiple sets of frames; (f) Comparing two frames by comparing the absolute difference between one frame and the negative image of the other frame; (g) Generating a confidence score from the result of comparing two frames.

In the new system, a computer system performs frame or image matching to locate a match for a selected image or images among one or more frames or images in a target set of frames or images. The images can be individual still images or frames from a sequence of images (e.g., a video file).

In one implementation, a software tool referred to as a logger is used to log events in a video file, such as a movie. The logger provides a user interface (UI) allowing a user to view the video in multiple ways and add information to the file to track events in the file (logging), such as the locations of bars and tone, slates, content, logos, and commercial blacks. The logger also provides frame matching to find desired frames in a selected file or files.

The logger includes components to support a set of features that allow users to match frames from the same, or different movie files. This frame matching feature's underlying algorithm centers around a basic concept known as the law of absolute difference, and compares positive and negative frames to determine relevance of the match and then returns the results based on a defined threshold. This functionality provides users with the ability to create textless masters and foreign texted masters by matching the inserts to the original program. In one example, a first file contains the original movie and a second file contains inserts, groups of frames to replace corresponding groups of frames in the original (e.g., frames with localized text for a particular language). Using frame matching, the user can identify the original frames that match the insert frames and then indicate which frames in the original movie file to replace with which frames from the insert file (manually and/or automatically). The logger can then output a new version using the original frames with selected frames replaced with the selected insert frames. Alternatively, the logger can create a file (e.g., a table of references) that guides playback between the original file and the insert file. A user can then create another file for different language using a different insert file.

Figure 18:
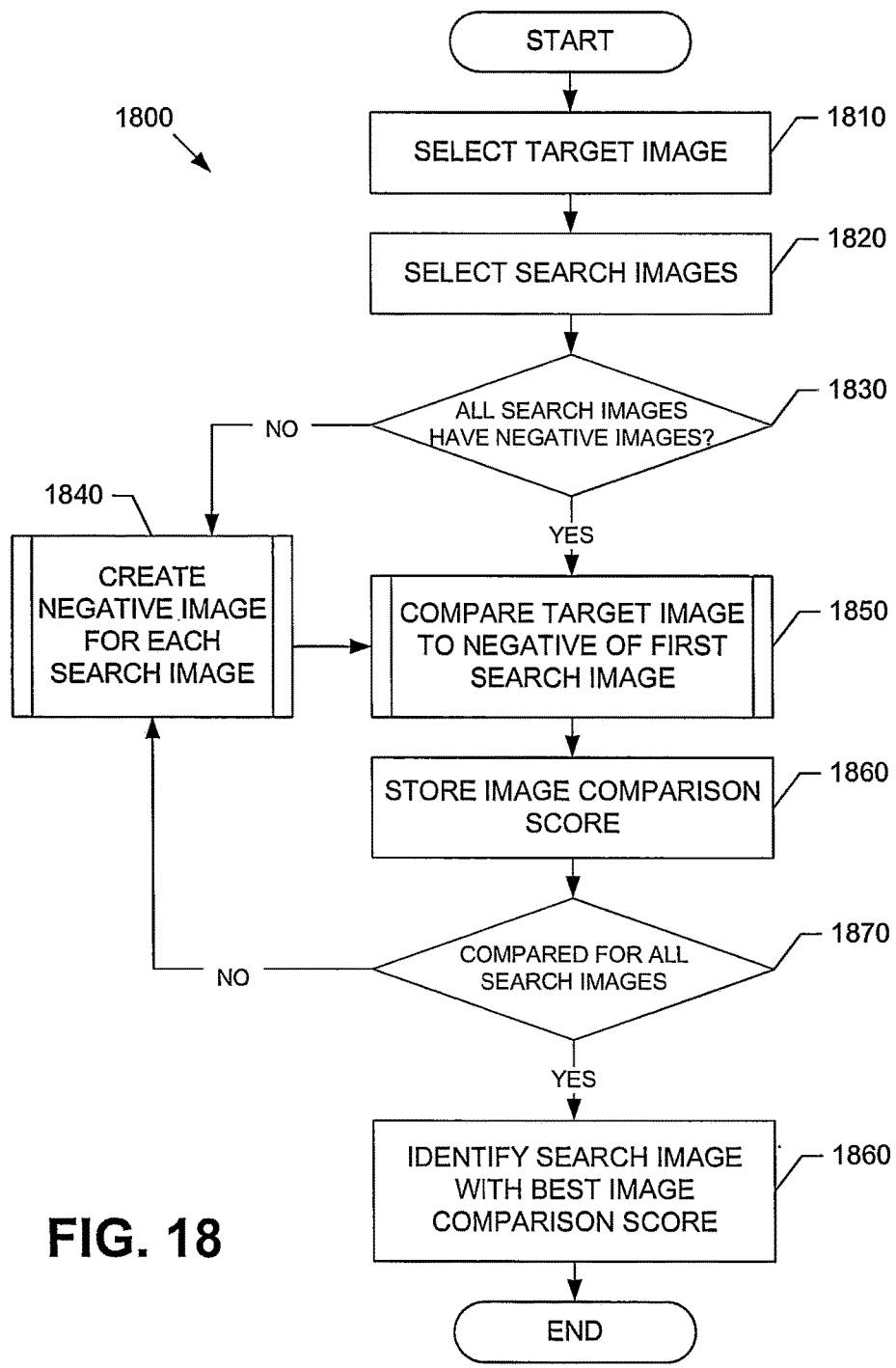
FIG. 18 shows a flowchart of one implementation of an image matching process.

FIG. 18 shows a flowchart of one implementation of an image matching process 1800. This process searches for the best match for a single selected image among a set of images. For example, a user of the logger can use this process to select a frame and then search for that frame in a selected video file (e.g., a movie). First, the user selects a target image, block 1810. The UI of the computer system provides a selection mechanism, such as through a search command associated with a currently displayed image. The user then selects a set of search images, block 1820. The search images can be in one or multiple files. For example, the user can select a video file through the UI and the computer system will use all the frame images in the video file as the search images. The computer system then determines if a negative image is available for each search image, block 1830. In one implementation, a negative image of a search image is an inversion of the search image, with all the colors of the search image color reversed. In one implementation, the computer system creates negative images for all images when the images are made accessible to the frame matching tool (e.g., when they are ingested into the system). If any search images do not have a corresponding negative image already created, the computer system generates a negative image for each search image without a negative image, block 1840. In another implementation, the negative image generation can be performed in parallel with comparing already generated or existing negative images.

Figure 19:
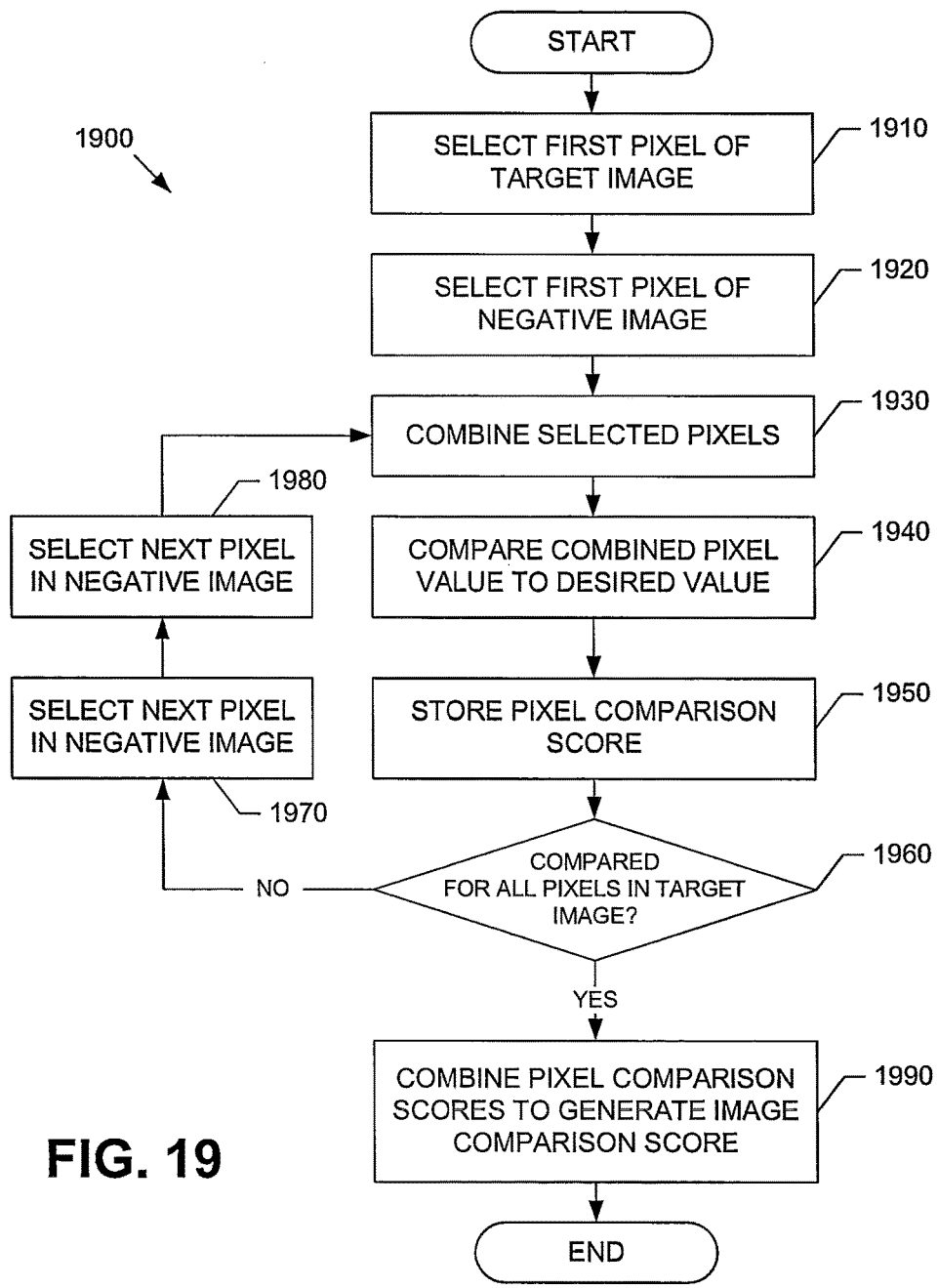
FIG. 19 shows a flowchart of one implementation of an image comparison process.

When all the search images have negative images, the computer system begins a comparison loop to compare the target image to the negative images for the search images. The computer system begins with the first search image and compares the target image to the negative image of the first search image to generate an image comparison score, block 1850. In one implementation, the computer system compares the images by determining the absolute difference between the target image and the negative image. FIG. 19 shows an implementation of one comparison process. The comparison generates an image comparison score or confidence score representing the level of similarity or difference between the target image compared to that negative image. The computer system stores the image comparison score, block 1860. The computer system determines if the target image has been compared to the negative images for all the search images, block 1870. If not, the computer system then compares the target image to the negative of the next search image generating a corresponding image comparison score, block 1880, and stores the score, returning to block 1860. The system can use an absolute difference comparison, or the process of FIG. 19, here as well. The computer system continues to compare the target image to negative images of search images until the target image has been compared with the negative images for all the search images (looping through blocks 1880, 1860, 1870).

When all the image comparisons have been made, the computer system identifies the search image with the best image comparison score, block 1890. In one implementation, the computer system selects the search image with the highest score. In another implementation, the computer system selects all the search images that have image comparison scores above a threshold. If no search image has a score above the threshold, the computer system returns an error or can return a best guess (e.g., an image with the highest score). In one implementation, the user can adjust the threshold to control the desired level of similarity and control results returned.

FIG. 19 shows a flowchart of one implementation of an image comparison process 1900. This process combines the pixel values of a target image and a negative image to determine the level of similarity of the target image and the image upon which the negative image is based (e.g., the search image in FIG. 18). The computer system iterates through all the pixels in both images. Initially, the computer system selects the first pixel in the target image, block 1910, and selects the first pixel in the negative image, block 1920. In one implementation, the computer system starts with the pixel at the upper left corner of each image and proceeds left to right, top to bottom.

The computer system combines the selected pixels to generate a combined pixel value, block 1930. In one implementation, the computer system combines or adds the pixel values. The computer system then compares the combined pixel value with a desired value to generate a pixel comparison score, block 1940. The desired value is set to indicate a desirable level of match or can be set to indicate a 100% match. In one implementation, if the negative image pixel is the reverse of the target image pixel, the combination will result in the desired value. The difference between the combined value and the desired value indicates a level of difference between the two pixels. Other pixel comparison techniques can also be used. The pixel comparison score indicates how similar or different the pixel in the target image is to the pixel in the base image (e.g., search image) corresponding to the pixel in the negative image. In one implementation, a high pixel comparison score indicates the pixels are highly similar. The computer system stores the pixel comparison score, block 1950.

The computer system determines if all the pixels in the target image have been compared to all the pixels in the negative image, block 1960. If not, the computer system then selects the next pixel in the target image, block 1970, and the next pixel in the negative image, block 1980. Then, the computer system starts the comparison for the selected pixels by combining the selected pixels, returning to block 1930. The computer system continues to compare the pixels of the target image to the pixels of the negative image until all the pixels of the target image have been compared with all the pixels of the negative image (looping through blocks 1930, 1940, 1950, 1960, 1970, 1980).

When all the pixel comparisons have been made, the computer system combines the pixel comparison scores to generate an image comparison score, block 1990. The image comparison score indicates the level of similarity between the target image and the base image (e.g., search image) upon which the negative image is based. In one implementation, a higher score indicates a higher level of similarity between the images.

In other implementations larger numbers of images can be selected and compared. For example, a single image or frame can be compared to images in multiple sets of images (e.g., multiple movie files). In another example, multiple images (e.g., a video clip or insert) can be selected as the target and the image of the target are compared against images in a single set of multiple sets of images. In one such example, a user selects a video insert and requests a search of multiple movie or video files to matching frames. In such an example, the user can use a video clip (or image) as a search term for a query to search video content. Additional information can also be used to help guide the search. For example, in one logger tool implementation, the logger can automatically select files for search images based on the name of the file from which the target image clip (e.g., in insert) has been selected. In another example, the logger tool can use timestamp or frame number information about the selected target image or clip to select frames or frame ranges from another file.

In some implementations, frame matching can be used as part of another process. Being able to identify the same or similar frames or images in separate sources can be helpful for organization and resource management.

In one such example, a video editing tool builds a cut list by using frame matching on multiple video samples and a final video file. A cut list provides a list of edits that were made to original video (such as film or video tape used to record live shooting of a television program or movie) to create a final version of the video. Without a cut list it can be difficult to determine which original video was used to create the final version (e.g., if a scene were shot multiple times on film, it may be difficult to know which shot was used, or how the pieces were edited together). First, all the frames are ingested into the video tool or an accessible database. Frames from the final version are used as target frames and the original video is used as the search frames. Using frame matching, the video tool can match frames from the final version to frames in the original video. The video tool can then create a cut list by grouping together sequential frames from the same sources (e.g., frames 1-200 are frames 1251-1450 in source video A, frames 201-275 are frames 12001-1275 in source video B, etc.).

In another example, frame matching can be used to identify frames that are different as well as or instead of frames that are the same. One such implementation of a video tool uses differential analysis to compare versions of a movie (or other video content) to determine what is unique in each file. For example, the tool can use differential analysis to compare the theatrical cut and the director's cut of a movie. Using frame matching, the tool can determine which frames are the same (or sufficiently similar) and which frames are different. In one implementation, the tool identifies frames that have a confidence score or comparison below a defined threshold to identify frames that are sufficiently different. This identification shows the delta or differences between the two versions being compared (more versions can also be compared serially or in parallel). The tool can present the unique frames from each version to the user or provide a list or report. The user can adjust the list or adjust the threshold to generate a new set of frames. The user can then use this information for additional editing or other operations, such as dynamic editing, re-editing, audio conform, subtitle confirm, and caption conform. In this way, the tool can re-create inserts from two or more larger video files, similar to a reverse process of matching an insert or clip to a larger video file.

One implementation includes one or more programmable processors and corresponding computer system components to store and execute computer instructions, such as to provide the image comparison and pixel comparisons, and generation, storage and comparison of comparison scores. The data and/or instructions can be stored and accessed on a single device or system or across connected or networked devices or systems.

Additional variations and implementations are also possible. For example, the video files can be movies, game content, television, web video, etc. In other examples, the frame matching can be used outside of professional video production, such as for consumer or user generated content, for organizing and matching images or video in personal collections, for searching locally stored or online content, etc. Accordingly, the claims are not limited only to the specific examples described above.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the examples focus on displaying and logging for movies, but a logger can be specialized for other video, such as television shows, internet video, or user generated content, or for audio, such as radio or podcasts, or other content, such as games or text, or combinations thereof (e.g., matching and conforming video, audio, and text, such as for screenplay matching and tracking). All features of each example are not necessarily required in a particular logger implementation. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method for comparing images with images from a plurality of video files, comprising:
    selecting a sequence of target images, wherein each target image of the sequence of target images includes a plurality of pixel values;
    selecting a sequence of search images from the plurality of video files, wherein each search image of the sequence of search images includes a plurality of pixel values;
    comparing each pixel value of each target image to each corresponding pixel value of a negative image associated with each search image to generate a pixel comparison score for each pixel of each search image,
    wherein each pixel value of the negative image is a reverse of a corresponding pixel value of each search image associated with the negative image;
    combining pixel comparison scores for all pixels of each target image to generate an image comparison score for each search image;
    identifying a search image from the sequence of search images taken from each video file of the plurality of video files with a highest image comparison score; and
    replacing the identified search image from each video file with a target image of the sequence of target images corresponding to the identified search image from each video file.

2. The method of claim 1, wherein the sequence of search images corresponds to frames of each video file of the plurality of video files.

3. The method of claim 2, wherein the frames of each video file form a movie.

4. The method of claim 1, wherein comparing each pixel value of each target image to each corresponding pixel value of the negative image comprises determining an absolute value difference between each pixel value of each target image and each pixel value of the negative image.

5. The method of claim 1, wherein comparing each pixel value of each target image to each corresponding pixel value of the negative image comprises:
   combining each pixel value of each target image and each corresponding pixel value of the negative image;
   comparing each combined pixel value with a desired value to generate the pixel comparison score for each pixel in each target image.

6. The method of claim 1, further comprising
   selecting at least one additional target image and comparing each of the at least one additional target image to the sequence of search images from the plurality of video files.

7. The method of claim 6, wherein the at least one additional target image corresponds to a clip of each video file.

8. The method of claim 1, wherein the image comparison score indicates a level of similarity between each target image and each search image.

9. The method of claim 1, wherein selecting the sequence of target images comprises
   selecting the sequence of target images from a single video file.

10. The method of claim 1, wherein selecting the sequence of target images comprises
    selecting the sequence of target images from multiple video files.

11. The method of claim 1, further comprising:
    storing the sequence of target images into an insert file;
    generating a table of references to guide playback between the video file and the insert file.

12. A non-transitory tangible storage medium storing a computer program for comparing images with images from a plurality of video files, the computer program comprising executable instructions that cause a computer to:
    select a sequence of target images, wherein each target image of the sequence of target images includes a plurality of pixel values;
    select a sequence of search images from the plurality of video files, wherein each search image of the sequence of search images includes a plurality of pixel values;
    compare each pixel value of each target image to each corresponding pixel value of a negative image associated with each search image to generate a pixel comparison score for each pixel of each search image,
    wherein each pixel value of the negative image is a reverse of a corresponding pixel value of each search image associated with the negative image;
    combine pixel comparison scores for all pixels of each target image to generate an image comparison score for each search image;
    identify a search image from the sequence of search images taken from each video file of the plurality of video files with a highest image comparison score; and
    replace the identified search image from each video file with a target image of the sequence of target images corresponding to the identified search image from each video file.

13. The non-transitory tangible storage medium of claim 12, wherein executable instructions that cause a computer to compare each pixel value of each target image to each corresponding pixel value of the negative image comprises executable instructions that cause a computer to
    determine an absolute value difference between each pixel value of each target image and each pixel value of the negative image.

14. The non-transitory tangible storage medium of claim 12, wherein executable instructions that cause a computer to compare each pixel value of each target image to each corresponding pixel value of the negative image comprises executable instructions that cause a computer to
    combine each pixel value of each target image and each corresponding pixel value of the negative image;
    compare each combined pixel value with a desired value to generate the pixel comparison score for each pixel in each target image.

15. The non-transitory tangible storage medium of claim 12, further comprising executable instructions that cause a computer to
    select at least one additional target image and compare each of the at least one additional target image to the sequence of search images from the plurality of video files.

16. A non-transitory tangible storage medium storing a computer program for comparing images, the computer program comprising executable instructions that cause a computer to:
    select a sequence of target images, wherein each target image of the sequence of target images includes a plurality of pixel values;
    select a sequence of search images from a plurality of video files, wherein each search image of the sequence of search images includes a plurality of pixel values;
    compare each target image to a negative image corresponding to each search image of the sequence of search images from the plurality of video files,
    wherein the negative image corresponding to each search image comprises an inversion of the corresponding search image with colors for all pixels in each search image reversed;
    generate an image comparison score for each search image taken from each video file of the plurality of video files by comparing each target image to each corresponding negative image of each search image;
    replace at least one search image of the sequence of search images from each video file with at least one corresponding target image of the sequence of target images; and
    generate a cut list which identifies a list of edits that were made to each search image to create the sequence of target images using the image comparison score.

17. The non-transitory tangible storage medium of claim 16, wherein the executable instructions that cause the computer to generate a cut list comprises executable instructions that cause the computer to
    group together sequential frames of each search image from each video file.

18. The non-transitory tangible storage medium of claim 16, wherein the executable instructions that cause the computer to compare each target image to the negative image corresponding to each search image comprises executable instructions that cause the computer to:
    compare each pixel value of each target image to each corresponding pixel value of the negative image corresponding to each search image to generate a pixel comparison score for each pixel of each search image; and combine pixel comparison scores for all pixels of each target image to generate the image comparison score for each search image.

* * * * *